Figure 2:
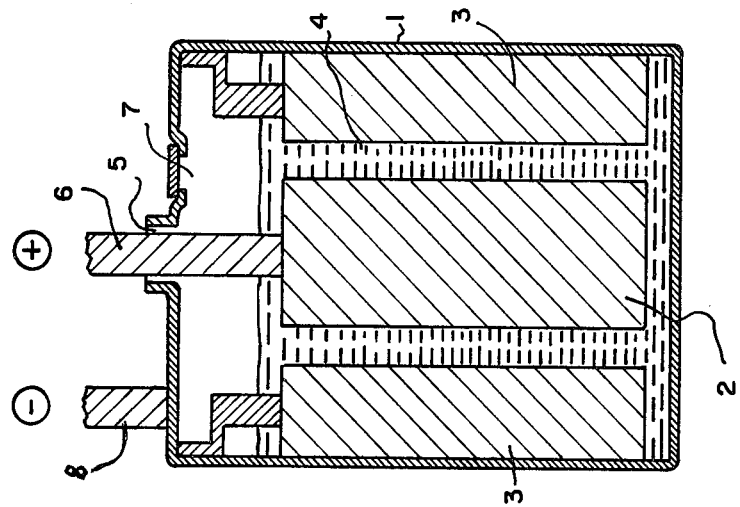

United States Patent [19]

Kappus et al.

[11] 4,275,129

[45] Jun. 23, 1981

[54] GALVANIC HIGH-TEMPERATURE CELL WITH SOLID NEGATIVE ELECTRODE AND MOLTEN ELECTROLYTE

[75] Inventors: Wolfgang Kappus, Viernheim; Waldemar Borger, Kelkheim, both of Fed. Rep. of Germany

[73] Assignee: Varta Batterie Aktiengesellschaft, Hanover, Fed. Rep. of Germany

[21] Appl. No.: 159,482

[22] Filed: Jun. 16, 1980

[30] Foreign Application Priority Data

Jun. 21, 1979 [DE] Fed. Rep. of Germany ....... 2924992

[51] Int. Cl.$^3$ ............................................. H01M 2/16
[52] U.S. Cl. ..................................... 429/112; 429/132
[58] Field of Search ................ 429/103, 112, 132, 218

[56] References Cited

U.S. PATENT DOCUMENTS

| | | | |
|---|---|---|---|
| 4,063,005 | 12/1977 | Mamantov et al. | 429/218 |
| 4,156,758 | 5/1979 | Vissers et al. | 429/112 |
| 4,189,827 | 2/1980 | Eberhart et al. | 429/112 |

Primary Examiner—Donald L. Walton
Attorney, Agent, or Firm—Weiser, Stapler and Spivak

[57] ABSTRACT

In a high-temperature cell using, for example, the system Li(Al)/LiCl, KCl/MeS (wherein Me is a heavy metal) the operating temperatures and the composition of the molten electrolyte are so selected that a solid phase is created through partial precipitation of at least one of the components of the salt mixture, which provides the separator function between the electrode plates. For example, a non-eutectically composed molten electrolyte of 80% by volume LiCl and 20% by volume KCl, at a given temperature corresponding to the operating point in the phase diagram, contains a solid LiCl frame whose pore volume of about 50% is filled with ion-conducting residual molten LiCl and KCl. Through combination with non-electron conducting inert material in grid or powder form, the permeability of the precipitated solid separator can be further controlled.

7 Claims, 2 Drawing Figures

GALVANIC HIGH-TEMPERATURE CELL WITH SOLID NEGATIVE ELECTRODE AND MOLTEN ELECTROLYTE

The invention relates to a galvanic high-temperature cell with a solid negative electrode and a molten electrolyte which consists of a mixture of at least two salts.

In galvanic high-temperature cells, extraordinary demands are imposed upon those structural components which do not participate directly in the delivery of current. In particular, because of the high thermal and corrosive loads, the separators are normally formed as diaphragms of a porous ceramic material or woven of inorganic fibers. Among those, there recently have gained importance the solid materials boron nitride and aluminum nitride, which are capable of being processed in textile-like manner. The production of inorganic separators is generally difficult and involves high costs. As a result, one frequently contents oneself with spacer elements between the electrodes.

For the negative electrode, there are preferred light metals having strongly electropositive characteristics as, for example, lithium. These are solidified by alloying with aluminum or silicon in view of the high operating temperatures.

The positive electrode material of high-temperature cells, having molten alkali metal halogenides as electrolytes, consists most frequently of heavy metal sulfides.

As the molten electrolyte there are used eutectically composed salt mixtures, for example, of the systems LiF/LiCl, NaF/NaI, LiBr/KI, or a three-component system such as LiF/LiCl/KBr. What determines the selection of one of these mixtures is the desire to operate at the lowest possible temperature because, with increasing operating temperature, there also increases the exposure to corrosion of the cell components as well as the solubility of the negative electrode material. In addition, the molten salt should have low resistance to ion conduction and must not attack the positive electrode material.

For the overwhelming number of known molten electrolytes, the eutectic temperatures are between 300° and 600° C.

The resistance to short-circuiting of high-temperature cells with molten electrolytes and known spacing arrangements, for example, in the form of strips of ceramic oxide materials such as $ZrO_2$ or MgO, cannot always be assured. On the other hand, porous walls of an inert solid considerably impede the ion mobility in the melt. Therefore separators have already been made of suitable solids in the form of a powder accumulation. Such a separator is known, for example, from U.S. Pat. No. 4,087,905. There, solid electrolyte particles are mixed with a heat-resistant powder of metal oxides or nitrides. After heating to the operating temperature these fill the packing interstices of the coarsely-dispersed powder accumulation in a molten fluid state.

A disadvantage of this separator construction is that the accumulation requires a certain distance between the positive and negative electrodes. Moreover, with increasing thickness of the electrolyte layer, the internal resistance of the cell rises. Accordingly, it is an object of the present invention to provide a molten electrolyte for high-temperature cells which assures ion transport and simultaneously performs the function of a separator.

This and other objects which will appear, are achieved in accordance with the invention by providing a molten electrolyte which contains, at the operating temperature of the cell, a solid phase formed through partial precipitation of at least one of the components of the salt mixture.

The volume relationship in which the liquid and solid phases are present at the operating temperature of the cell should be in the range of 10:1 to 1:10, and preferably in the range of 2:1 to 1:2.

It is further advantageous, although not essential, that the salt mixture embodying the invention be composed of such components as to form no mixed crystals in the solid state. In the simplest case, mixed crystal formation means that anions, or cations in crystal A are replaced by an equal quantity of anions or cations respectively of crystal B. This presupposes a similar size of the particles replacing each other. The difference between the respective ion radii should not exceed 15%.

A salt mixture which is well-suited for the formation of the solid separator, according to the invention, is provided by the binary system LiCl/KCl. In its solid state this is not miscible in the above-mentioned sense, because the $Li^+$ ions and the $K^+$ ions differ in their radii by about 70%. This LiCl/KCl system has already achieved practical importance as a molten electrolyte. It has a eutectic point of 350° C.

The essence of the invention can be illustrated especially simply by reference to a binary system.

Figure 1:
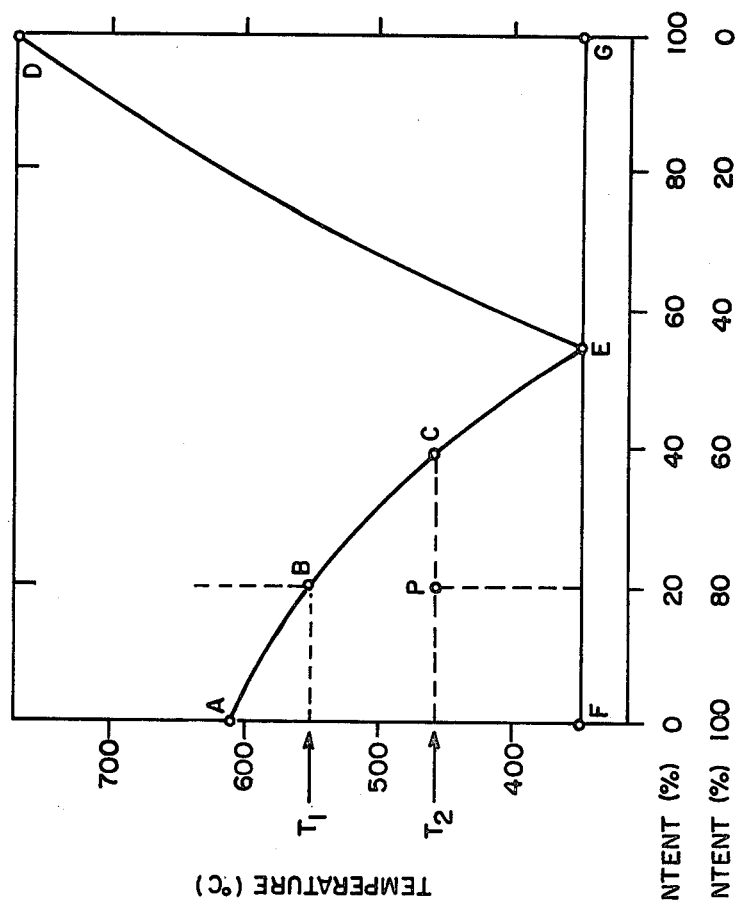

For further details, reference is made to the discussion which follows in light of the accompanying drawings wherein FIG. 1 is a phase diagram for a system embodying the invention; and FIG. 2 illustrates diagramatically a high-temperature cell embodying the invention.

Referring to FIG. 1, this shows a phase diagram for the LiCl/KCl system. This system is liquid above the curve A B C D E, whose eutectic point is E. Below the curve and down to the level of the straight line F E G, solid and liquid phases are present side-by-side. A melt of 8 parts by volume LiCl and 2 parts by volume KCl (ratio 4:1) is cooled starting from a temperature $T>T_1$. Below $T_1$, solid LiCl begins to crystallize out of the melt (point B). The melt thereby becomes poorer in LiCl. With continuing cooling a continuously increasing quantity of solid LiCl establishes itself along BC, in equilibrium with a melt which becomes continuously poorer in LiCl. This continues until at temperature $T_2$ the LiCl/KCl ratio in the melt is only 3:2 (point C). Thus, of the initially provided 8 parts by volume LiCl, 5 parts by volume are present in solid form, whereas 3 parts by volume LiCl together with the unchanged 2 parts by volume KCl remain in the melt. Thus, there has been formed an LiCl separator with 50% porosity. The invention thus is predicated on the fact that binary melts of the type LiCl/KCl are liquid, i.e. without solid components, at a given temperature only in a predetermined concentration range. Through suitable mixture ratios, which lie alongside the eutectic composition and predominantly in the direction of one of the two components, it becomes possible to also have one of these components present in the solid phase. In this manner, there is produced between the electrode plates, in situ so to speak, a solid framework of LiCl, for example, as separator. The excess melt (e.g. LiCl/KCl) provides the ion conduction and is located in the pores of the separator.

Basically, similar solid precipitations are also possible for eutectic salt melts of ternary or quaternary systems.

By means of the phase diagram, an optimal composition of the solid melt separator can be determined, depending upon the requirements. The porosity can also be controlled by the choice of $T_2$ and the composition of the initial melt. On the other hand, optimization of the pore distribution must be done experimentally. Suffice it to point out that the pore structure can be controlled, within limits, by variation of the starting temperature and the rate of cooling. Possibly, an ion current also influences the framework formation.

It is not essential that a cohesive framework be present in order for the solid phase to function as separator. An "island" structure also suffices, in which the precipitated solid particles are suspended in the melt independently of each other.

Referring to FIG. 2, this shows a steel vessel 1 in which a positive FeS electrode 2 of about 8 mm thickness is surrounded by two negative Li-Al alloy electrodes 3 of about 5 mm thickness. The interstices of about 2 mm width between the electrodes, as well as the remaining cell volume up to the top edge of the electrodes, is filled with the LiCl/KCl molten electrolyte 4. At the top of the steel vessel there is a pass-through 5 for the positive electrode take-off conductor 6, a filler opening 7 for the electrolyte, and a welded-on take-off conductor stub 8 for the negative electrodes 3, which are short-circuited to the steel vessel.

To place the high-temperature cell embodying the invention in operation, the user has the option of not cooling the initial mixture of the electrolyte salt as described, starting from the completely molten state, but rather, through careful heating up to temperature $T_2$, to bring it to the desired state corresponding to point C on the curve. For the example illustrated in FIG. 1, this would yield an operating point P, which essentially determines the quality of the separator so produced by its coordinates and its distance from the curve segment A E.

Ordinarily, eutectically composed salt melts are used as electrolytes in high-temperature cells, and the operating temperatures are maintained sufficiently above the eutectic temperature to positively prevent solidification of the electrolyte components, which can be occasioned by possible local variations in concentration.

In contrast, to operate the solid/melt separator according to the invention, one starts deliberately with a non-eutectic composition of the electrolyte and aims for a partial solidification of one of its components.

The separator embodying the invention can also be used in combination with a previously provided first separator, made of an inert material which is electronically non-conductive and heat-resistant. Thus, the partial precipitation of a solid phase can take place, for example, between or upon the particles of a powder separator. As inert separator materials, there can be used, for example, $MgO$, $CaO$, $AlN$, $Si_3N_4$ or $LiAlO_2$. The volume relationship of inert material to the solid phase of the molten electrolyte existing at operating temperature can be in the range 9:1 to 1:9 and preferably 3:1 to 1:3.

The same is true for grid-like, textile, or other porous inorganic separators of any known type. The permeability of these structures for the liquid molten electrolyte, and with it the resistance characteristics of the cell, can thus be controlled by the quantity of solid-phase precipitate.

We claim:

1. Galvanic high-temperature cell with solid negative electrode and molten electrolyte comprising a mixture of at least two salts, wherein
   the molten electrolyte contains at the operating temperature of the cell a solid phase formed through partial precipitation of least one of the components of the salt mixture.

2. The cell of claim 1 wherein there exists at the operating temperature of the cell, a volume relationship of liquid to solid phase of the molten electrolyte in the range of 10:1 to 1:10.

3. The cell of claim 2 wherein the range is from 2:1 to 1:2.

4. The cell of claim 1 wherein
   the molten electrolyte comprises LiCl and KCl.

5. The cell of claim 1 wherein
   the molten electrolyte contains outside the electrodes, an electronically non-conducting, heat-resistant inert material.

6. The cell of claim 4 wherein
   the volume relationship of inert material to solid phase of molten electrolyte present at the operating temperature is in the range of 9:1 to 1:9.

7. The cell of claim 6 wherein the range is from 3:1 to 1:3.

* * * * *